(12) United States Patent
Kimura et al.

(10) Patent No.: US 8,369,896 B2
(45) Date of Patent: Feb. 5, 2013

(54) BASE STATION, COMMUNICATION SYSTEM, AND COMMUNICATION METHOD

(75) Inventors: Dai Kimura, Kawasaki (JP); Takato Ezaki, Kawasaki (JP); Yuya Harada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/820,209

(22) Filed: Jun. 22, 2010

(65) Prior Publication Data

US 2011/0053589 A1  Mar. 3, 2011

(30) Foreign Application Priority Data

Aug. 26, 2009  (JP) .................. 2009-195395

(51) Int. Cl.
*H04M 1/00* (2006.01)
(52) U.S. Cl. ............ 455/561; 455/550.1; 455/450
(58) Field of Classification Search .......... 455/561, 455/550.1, 450
See application file for complete search history.

(56) References Cited

U.S. PATENT DOCUMENTS

| | | | |
|---|---|---|---|
| 2006/0293042 A1* | 12/2006 | Hosokawa et al. | 455/422.1 |
| 2008/0247375 A1 | 10/2008 | Muharemovic et al. | |
| 2008/0248803 A1* | 10/2008 | Lee et al. | 455/450 |
| 2009/0042512 A1* | 2/2009 | Haseba et al. | 455/63.1 |
| 2010/0075689 A1* | 3/2010 | Uemura et al. | 455/452.1 |

FOREIGN PATENT DOCUMENTS

WO  2009024614  2/2009

OTHER PUBLICATIONS

Arne Simonsson, et. al.; "Frequency Reuse and Intercell Interference Co-ordination in E-UTRA"; Wireless Access Networks, Ericsson Research, Lulea, Sweden; IEEE 2007.

Jianming Wu, et al.; "Step-Function based Adaptive Fractional Frequency Reuse"; Fujitsu Laboratories Ltd., YRP R&D Center, 5-5, Hikari-No-Oka, Yokosuka-shi, Kanagawa 239-0487, Japan; The Institute of Electronics Information and Communication Engineers, EICE Technical Report, SIP 2008-130, RCS 2008-178 (Jan. 2009).

Nokia; "OFDMA Downlink inter-cell interference mitigation"; Agenda Item: 13.1.3; Document for: Discussion and Decision; R1-060291; 3GPP TSG RAN WG1 Meeting #44; Denver, Colorado, Feb. 13-17, 2006.

Qualcomm Europe: "Inter-eNB X2 Interface design considerations", 3GPP TSG-RAN WG1 #49bis, R1-072739, Agenda Item 5.6; 3rd Generation Partnership Project (3GPP), Mobile Competence Centre; 650, Route Des Lucioles; F-06921 Sophia-Antipolis Cedex; France, vol. RAN WG1, No. Orlando, USA; 20070620, Jun. 20, 2007, XP050106424, [retrieved on Jun. 20, 2007].

(Continued)

*Primary Examiner* — Danh Le
(74) *Attorney, Agent, or Firm* — Myers Wolin, LLC

(57) ABSTRACT

A base station used in a communication system wherein user terminals are classified into cell center terminals and cell edge terminals, based on reception quality and includes a receiving unit that receives cell edge band information transmitted from another base station and indicative of a cell edge band allocated to a cell edge terminal in a nearby cell; a determining unit that determines a cell edge band for a cell of the base station, based on the cell edge band information for a plurality of nearby cells and received by the receiving unit; and a communicating unit that, via the cell edge band determined by the determining unit, communicates with the cell edge terminals in the cell of the base station.

20 Claims, 14 Drawing Sheets

OTHER PUBLICATIONS

Nortel: "Further Discussion on Adaptive Fractional Frequency Reuse", 3GPP TSG-RAN WG1#48-BIS, R1-071449 (Adaptive-FFR), Agenda Item 7.6, 3rd Generation Partnership Project (3GPP), Mobile Competence Centre; 650, Route Des Lucioles; F-06921 Sophia-Antipolis Cedex; France, vol. RAN WG1, No. St. Julian; 20070403, Apr. 3, 2007, XP050105386, [retrieved on Apr. 3, 2007].
Extended European Search Report dated Nov. 18, 2010 for corresponding EP application No. 10166929.9.

* cited by examiner

| i | k | $A_{i,k}$(others) | 1500 |
|---|---|---|---|
| 1 | 0 | 5 | |
| 1 | 1 | 10 | |
| 1 | 2 | 7 | |
| 2 | 0 | 4 | |
| 2 | 1 | 3 | |
| 2 | 2 | 7 | |

FIG.16

| CELL EDGE BAND SELECTION PATTERN I | CELL EDGE BAND INDEX | | INTERFERENCE METRIC | | INTERFERENCE METRIC MAXIMUM VALUE |
|---|---|---|---|---|---|
| | SECTOR 1 | SECTOR 2 | SECTOR 1 | SECTOR 2 | |
| 0 | 0 | 0 | 8 | 10 | 10 |
| 1 | 0 | 1 | 5 | 3 | 5 |
| 2 | 0 | 2 | 5 | 7 | 7 |
| 3 | 1 | 0 | 10 | 4 | 10 |
| 4 | 1 | 1 | 13 | 9 | 13 |
| 5 | 1 | 2 | 10 | 7 | 10 |
| 6 | 2 | 0 | 7 | 4 | 7 |
| 7 | 2 | 1 | 7 | 3 | 7 |
| 8 | 2 | 2 | 10 | 13 | 13 |

1600

US 8,369,896 B2

BASE STATION, COMMUNICATION SYSTEM, AND COMMUNICATION METHOD

CROSS REFERENCE TO RELATED APPLICATIONS

This application is based upon and claims the benefit of priority of the prior Japanese Patent Application No. 2009-195395, filed on Aug. 26, 2009, the entire contents of which are incorporated herein by reference.

FIELD

The embodiments discussed herein are related to a base station, a communication system, and a communication method.

BACKGROUND

Long term evolution (LTE) systems, i.e., 3.9 generation mobile telephone systems, employ orthogonal frequency division multiplexing (OFDM), which has a frequency repetition number of one in the downlink. Thus, out of concern that increased inter-cell interference at cell boundaries leads to deterioration of throughput, the application of inter-cell interference coordination (ICIC) using a technique of fractional frequency reuse (FFR) is being investigated (see, e.g., Simonsson, A., et al., "Frequency Reuse and Intercell Interference Co-ordination in E-UTRA", VTC2007-Spring., pp. 3091-3095, 2007 and Wu, Jianming, et al., "Step-Function based Adaptive Fractional Frequency Reuse," IEICE Tech. Rep., Vol. 108, No. 391, RCS2008-178, pp. 35-38, 2009).

In ICIC of LTE, base stations exchange relative narrowband transmission power (RNTP), which is a signal indicative of the level of transmission power for each band. It is thought that the effects of interference reduction may be improved by using RNTP as compared to FFR, which is static.

In a real environment, it is conceivable that more complicated cell shapes may be formed due to various base station arrangements and radio wave propagation environments and that the distribution of user equipment (UE), i.e., user terminals, varies according to the time of day. Therefore, the development of an algorithm utilizing RNTP such that the effect of ICIC is obtained constantly is demanded to enable adaptation to changes in a complicated environment.

In a conventional FFR mode in which information is not exchanged between cells, a system band is divided into multiple bands and a portion thereof is determined as a cell edge band. The cell edge band is set as a cell-specific parameter for each cell so as to be different from nearby cells as much as possible (see, e.g., "OFDMA Downlink inter-cell interference mitigation", 3GPP TSG RAN WG1 MEETING #44 R1-060291, Denver, Colo., Feb. 13-17, 2006).

A scheduler in a base station classifies each UE in a cell as a cell edge terminal or a cell center terminal based on the average signal to interference and noise ratio (SINR) of the UE, etc., and schedules the cell edge terminals in the cell edge band. The interference at the cell edge terminals is mitigated by performing transmission using relatively greater electric power for the cell edge terminals and using relatively smaller electric power for the cell center terminals.

However, the conventional techniques have a problem in that it is difficult to appropriately determine a cell edge band for allocating a cell edge terminal in a real environment and interference at the cell edge terminal cannot be mitigated in an efficient manner. In a cell arrangement having a complicated cell shape, it is more difficult to determine the cell edge band. Such a problem is not limited to an LTE system and may occur in other communication systems that perform radio communication.

SUMMARY

According to an aspect of an embodiment, a base station used in a communication system wherein user terminals are classified into cell center terminals and cell edge terminals based on reception quality, and includes a receiving unit that receives cell edge band information transmitted from another base station and indicative of a cell edge band allocated to a cell edge terminal in a nearby cell; a determining unit that determines a cell edge band for a cell of the base station, based on the cell edge band information for a plurality of nearby cells and received by the receiving unit; and a communicating unit that, via the cell edge band determined by the determining unit, communicates with the cell edge terminals in the cell of the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a schematic depicting an example of calculation of the interference metric for each band.

DESCRIPTION OF EMBODIMENTS

Embodiments of the present invention will be explained with reference to the accompanying drawings.

Figure 1:
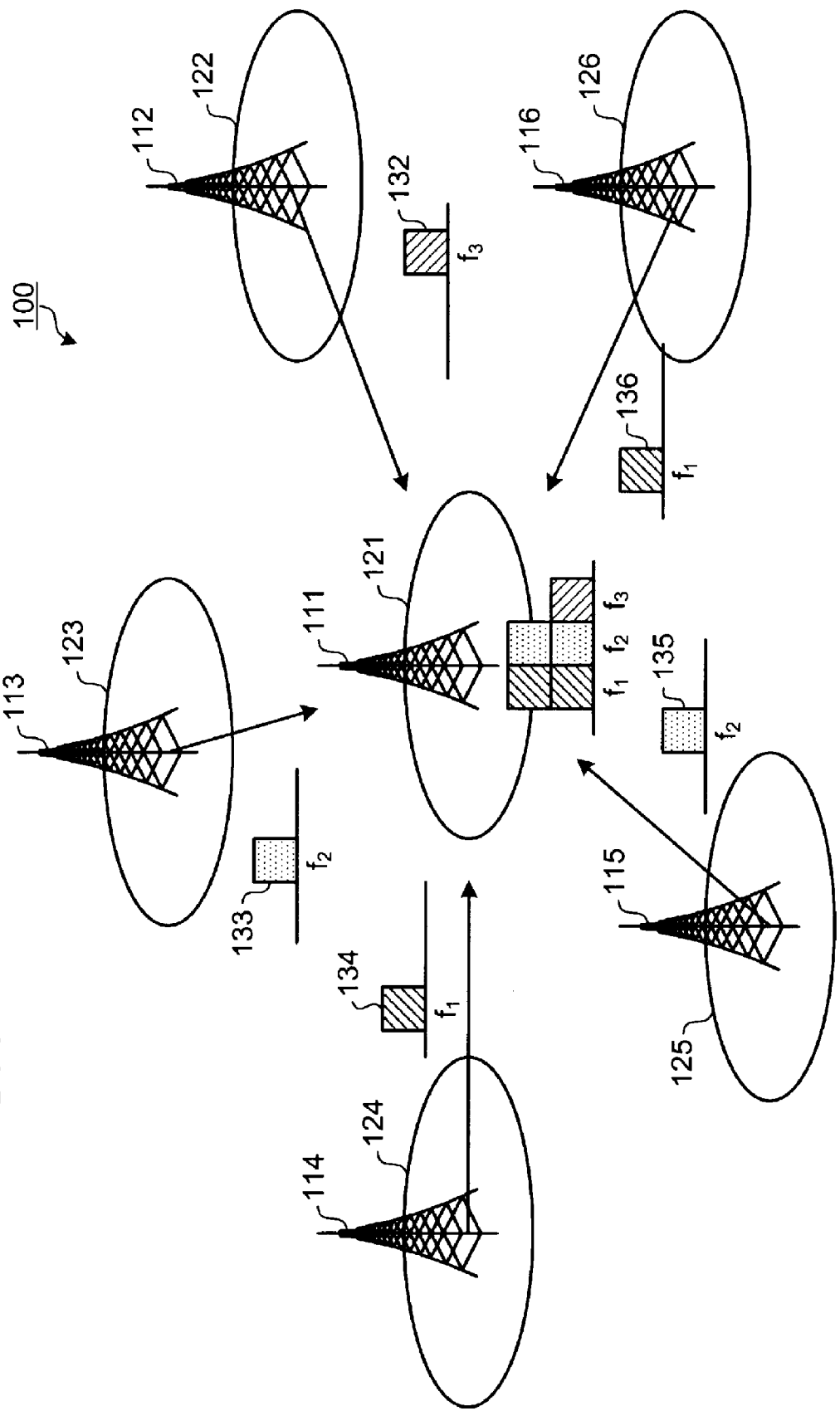
FIG. 1 is a diagram of an exemplary configuration of a communication system according to a first embodiment.

FIG. 1 is a diagram of an exemplary configuration of a communication system according to a first embodiment. As depicted in FIG. 1, a communication system 100 includes base stations 111 to 116. Each of the base stations 111 to 116 forms a respective cell 121 to 126 and wirelessly communicates with UEs located in the formed cell 121 to 126. In the communication system 100, each of the base stations 111 to 116, to perform communication, classifies the UEs as cell edge terminals and cell center terminals based on the reception quality.

For example, among UEs located in the cell 121, the base station 111 classifies UEs having relatively high reception quality as cell center terminals and UEs having relatively low reception quality as cell edge terminals. Specifically, the base station 111 classifies UEs having a reception quality equal to or greater than a threshold as cell center terminals and UEs having a reception quality less than the threshold as cell edge terminals. Similarly, the base stations 112 to 116 classify, among UEs located in the cells 122 to 126, UEs having a relatively high reception quality as cell center terminals and UEs having a relatively low reception quality as cell edge terminals.

The base station 111 sets the transmission power for a cell edge terminal in the cell 121 to be larger than the transmission power for a cell center terminal in the cell 121. Similarly, each of the base stations 112 to 116 sets the transmission power for cell edge terminals in the respective cell of the base station 112 to 116 to be larger than the transmission power for cell center terminals in the respective cell thereof.

The base stations 111 to 116 transmit to and receive from one another, cell edge band information indicative of bands (cell edge bands) actually allocated to cell edge terminals in the respective cell of each base station 111 to 116. For example, the base station 111 receives the cell edge band information for the cells 122 to 126 from respectively corresponding base stations 112 to 116 and transmits the cell edge band information for the cell 121 to the base stations 112 to 116. The transmission and reception of the cell edge band information may be implemented by RNTP, for example.

In the following description, the cells 122 to 126 are assumed to be nearby cells of the cell 121. A nearby cell of the cell 121 is a cell that is located near the cell 121 and has a potential of causing interference with the cell 121. Nearby cells are preliminarily defined in relation to the cell 121. For example, cells in an area within a given distance from the base station 111 are defined as nearby cells.

In the communication system 100, it is assumed that the entire frequency band (system band) is divided into bands $f_1$ to $f_3$. As denoted by reference numerals 132 to 136, it is assumed that the cell edge bands of the base stations 112 to 116 are the bands $f_3$, $f_2$, $f_1$, $f_2$, and $f_1$, respectively. Therefore, the cell edge band information received by the base station 111 from the base stations 112 to 116 indicates the bands $f_3$, $f_2$, $f_1$, $f_2$, and $f_1$, respectively. The bands need not be successive in terms of frequency.

The base station 111 determines the cell edge band of the cell 121, based on the bands $f_3$, $f_2$, $f_1$, $f_2$, and $f_1$ indicated by the cell edge band information from the base stations 112 to 116. For example, the base station 111 respectively counts the number of each band indicated by the cell edge band information and preferentially determines a band having a smaller count to be the cell edge band of the cell 121.

In the example depicted in FIG. 1, if the cell edge bands indicated by the cell edge band information received from the base stations 112 to 116 are counted, the count results for the band $f_1$, the band $f_2$, and the band $f_3$ are 2, 2, and 1, respectively. Therefore, the base station 111 determines the band $f_3$, which has the smallest count result, to be the cell edge band, for example.

Figure 2:
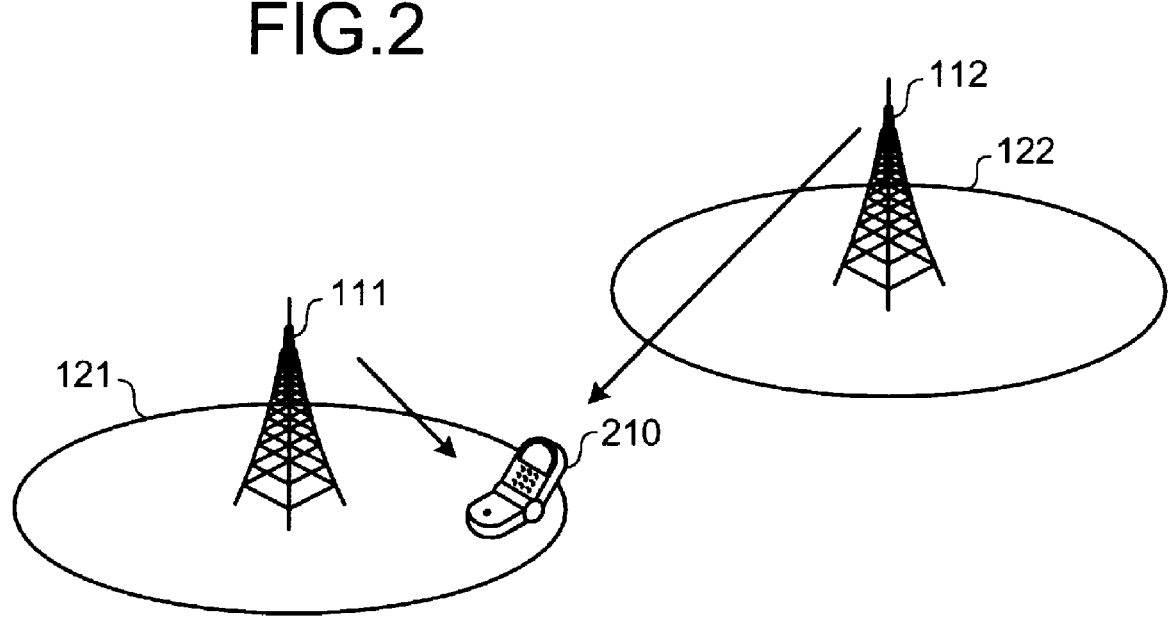
FIG. 2 is a schematic depicting measurement of reception quality of UE in a cell.

FIG. 2 is a schematic depicting measurement of reception quality of UE in a cell. UE 210 depicted in FIG. 2 is UE located in the cell 121 of the base station 111. The UE 210 measures reception quality by receiving a reference signal transmitted from the base station 111. The UE 210 transmits to the base station 111, reception quality information indicative of the measured reception quality. For example, the base station 111 classifies the UE 210 as a cell center terminal or a cell edge terminal, based on the reception quality information received from the UE 210.

When the UE 210 is located in the cell 121, the UE 210 may receive a reference signal transmitted from the base station 112 of the cell 122. For example, if the reception quality of the reference signal received from the base station 112 becomes higher than the reference signal received from the base station 111, the UE 210 performs handover from the cell 121 to the cell 122.

Figure 3:
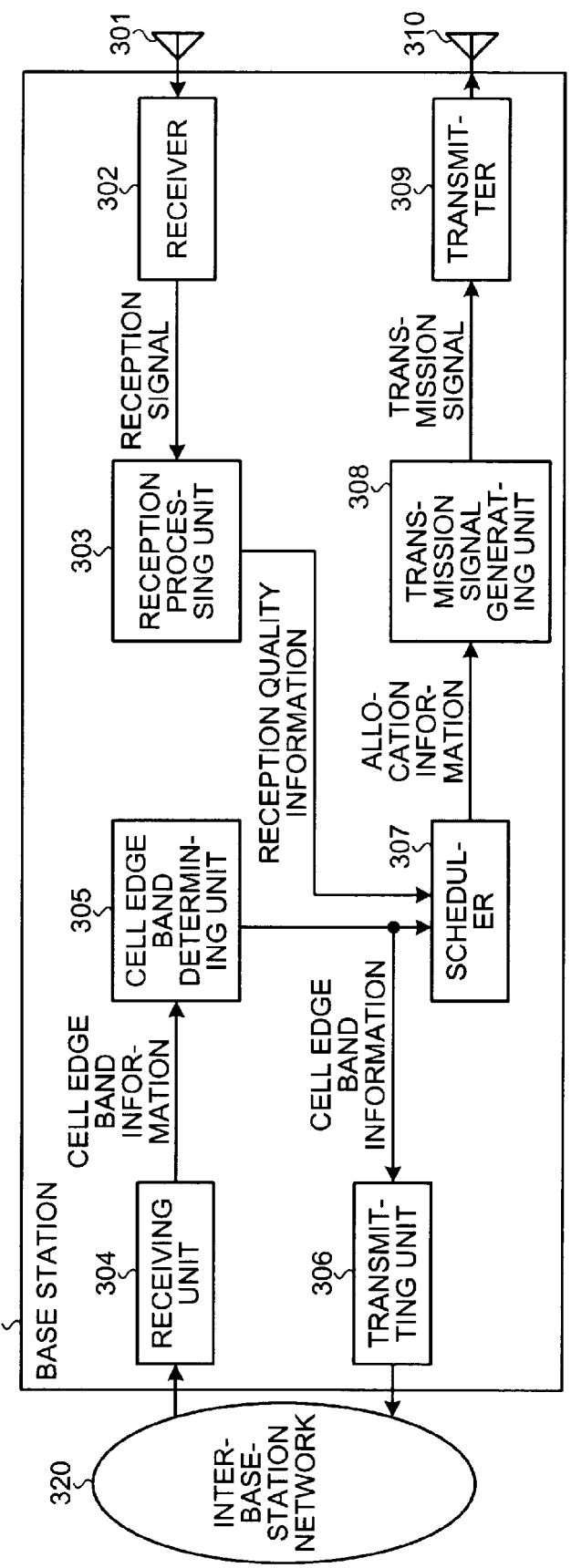
FIG. 3 is a block diagram of an exemplary configuration of a base station according to the first embodiment.

FIG. 3 is a block diagram of an exemplary configuration of a base station according to the first embodiment. As depicted in FIG. 3, the base station 111 includes a reception antenna 301, a receiver 302, a reception processing unit 303, a receiving unit 304, a cell edge band determining unit 305, a transmitting unit 306, a scheduler 307, a transmission signal generating unit 308, a transmitter 309, and a transmission antenna 310.

An inter-base-station network 320 is a network connecting the base stations 111 to 116 with each other. The inter-base-station network 320 is a wired network, for example. The receiver 302 receives, via the reception antenna 301, a signal wirelessly transmitted from UE (e.g., the UE 210 of FIG. 2) located in the cell 121 (see FIG. 1) of the base station 111. The receiver 302 outputs the received reception signal to the reception processing unit 303.

The reception signal received by the receiver 302 includes reception quality information (e.g., SINR) indicative of the reception quality from the base station 111 measured by the UEs. The reception processing unit 303 acquires the reception quality information by performing channel compensation and error correction for the reception signal output from the receiver 302 and outputs the acquired reception quality information to the scheduler 307.

The receiving unit 304 receives, via the inter-base-station network 320, the cell edge band information for the cells 122 to 126 transmitted from the base stations 112 to 116. The receiving unit 304 may receive the cell edge band information directly from the base stations 112 to 116 or via a higher-level server of the base stations 112 to 116. The receiving unit 304 outputs the received cell edge band information to the cell edge band determining unit 305.

The cell edge band determining unit 305 determines the cell edge band of the cell 121 based on the cell edge band information output from the receiving unit 304. For example, the cell edge band determining unit 305 counts the number of each band indicated by the cell edge band information and preferentially determines a band having a smaller count result as the cell edge band. Specifically, the cell edge band determining unit 305 calculates an interference metric $A_k$ for each band k using equation 1.

$$A_k = \sum_{j \in J} X_{j,k} \quad (1)$$

In equation 1, J denotes a set of nearby cells j (the cells 122 to 126) of the base station 111. $X_{j,k}$ denotes the cell edge band information of the nearby cells j. j denotes an index of the nearby cells (the cells 122 to 126). k denotes an index of bands acquired by dividing the entire band. $X_{j,k}$ becomes "1", if the band k of the nearby cell j is the cell edge band and becomes "0", if the band k of the nearby cell j is not the cell edge band.

For example, if the cell edge band of the cell 122 (assumed to have an index of 1) is the band $f_3$ (assumed to have an index of 2), the cell edge band information from the base station 112 indicates $X_{1,0}=0$, $X_{1,1}=0$, and $X_{1,2}=1$. The cell edge band determining unit 305 preferentially determines a band having a smaller calculated interference metric $A_k$ (count result) to be the cell edge band for the cell thereof. The cell edge band determining unit 305 need not select one of the bands acquired by dividing the entire band and may select multiple bands.

The cell edge band determining unit 305 outputs the cell edge band information indicative of the determined cell edge band to the transmitting unit 306 and the scheduler 307. The transmitting unit 306 transmits, via the inter-base-station network 320 to the base stations 112 to 116, the cell edge band information output from the cell edge band determining unit 305 for the cell thereof. This enables each of the base stations 112 to 116 to determine the cell edge band for the respective cell thereof, based on the cell edge band information of the cell 121.

The scheduler 307, the transmission signal generating unit 308, and the transmitter 309 form a communicating unit that communicates with the UEs in the cell 121 via the cell edge band determined by the cell edge band determining unit 305. The scheduler 307 allocates a communication resource (e.g., frequency resource) to each UE. Specifically, the scheduler 307 classifies the UEs in the cell 121 into cell center terminals and cell edge terminals, based on the reception quality indicated by the reception quality information output from the reception processing unit 303. For example, the scheduler 307 classifies UEs having a reception quality that is equal to or greater than a predetermined threshold as cell center terminals and UEs having a reception quality that is less than the predetermined threshold as cell edge terminals.

The scheduler 307 allocates, to cell edge terminals, the cell edge band indicated by the cell edge band information output from the cell edge band determining unit 305. The scheduler 307 allocates, to cell center terminals, a band different from that of the cell edge terminal. For example, the scheduler 307 allocates to a cell center terminal, a band different from the cell edge band. However, if band is available in the cell edge band, a cell center terminal may be allocated to the cell edge band.

The scheduler 307 determines the power of transmission from the base station 111 to each UE. Specifically, the scheduler 307 allocates to the cell edge terminal, transmission power that is greater than the transmission power allocated to the cell center terminal. For example, if the bandwidth of the cell edge band accounts for ⅓ of the entire bandwidth, the transmission power for the cell edge terminal is set to +3 [dB] from a reference transmission power and the transmission power for the cell center terminal is set to −3 [dB].

This enables the communication with the cell edge terminal to be performed by using a transmission power that is greater than the transmission power used for the communication with the cell center terminal without changing the total transmission power for all of the UEs. The scheduler 307 outputs to the transmission signal generating unit 308, allocation information indicative of the allocation results of the frequency resource and the transmission power.

The transmission signal generating unit 308 generates a transmission signal by performing channel encoding and modulation of the transmission information for each UE based on allocation information output from the scheduler 307. The transmission signal generating unit 308 outputs the generated transmission signal to the transmitter 309. The transmission signal generating unit 308 stores the allocation information output from the scheduler 307 to the transmission signal.

The transmitter 309 wirelessly transmits, via the transmission antenna 310 and to the UEs of the cell 121, the transmission signal output from the transmission signal generating unit 308. The UEs in the cell 121 receive the transmission signal wirelessly transmitted from the base station 111. The UEs in the cell 121 communicate with the base station 111 based on the allocation information carried by the received transmission signal.

The cell edge band determining unit 305 and the scheduler 307 may be implemented by a computing unit such as a digital signal processor (DSP), for example. The receiving unit 304 and the transmitting unit 306 may be implemented by a communication interface for wired communication, for example. Although an exemplary configuration of the base station 111 is described herein, for example, the base stations 112 to 116 (see FIG. 1) have the same configuration as the base station 111.

Figure 4:
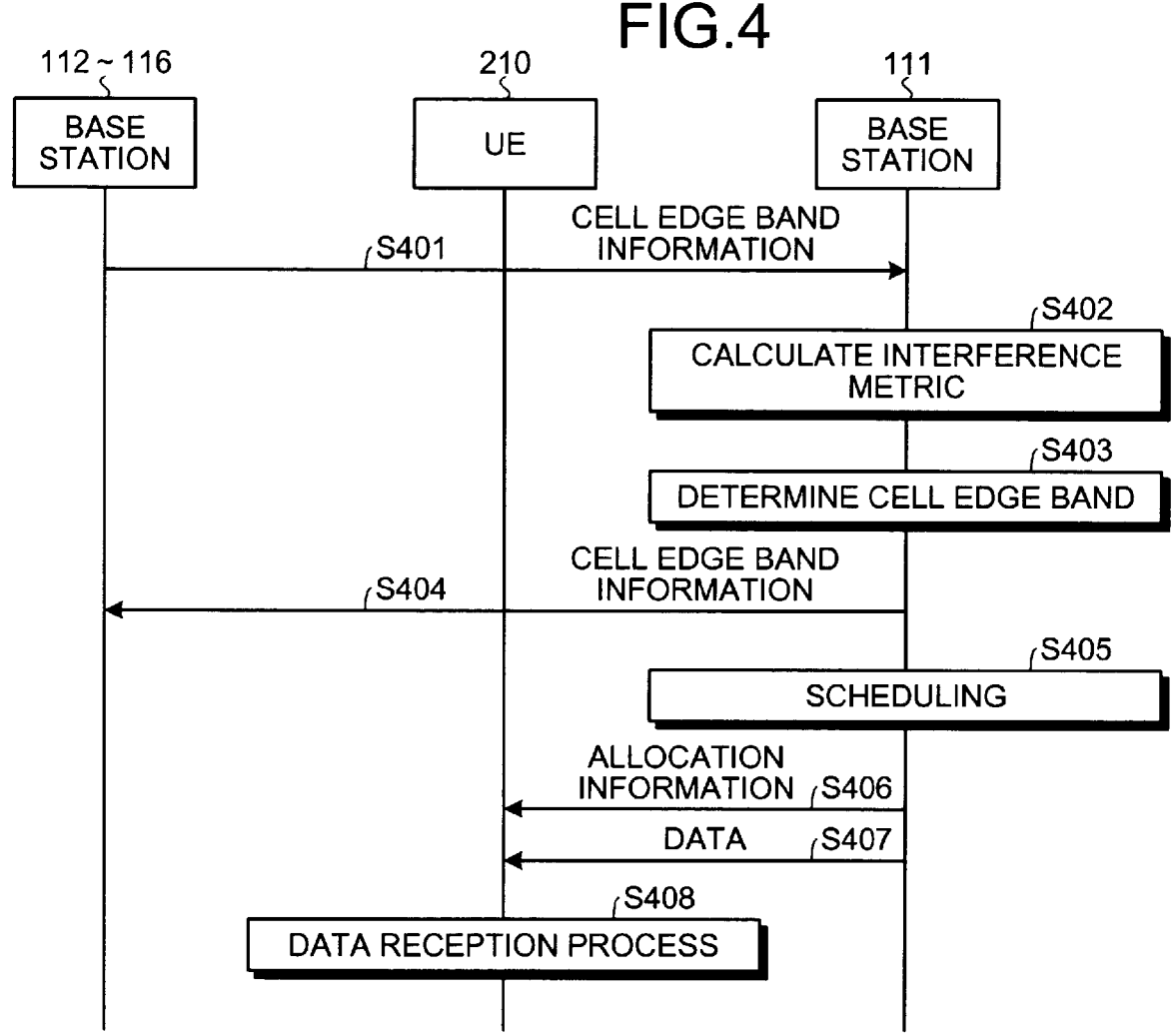
FIG. 4 is a sequence diagram of an example of the operation of the communication system according to the first embodiment.

FIG. 4 is a sequence diagram of an example of the operation of the communication system according to the first embodiment. It is assumed that the UE 210 is classified as a cell edge terminal in the cell 121. As depicted in FIG. 4, first, the base stations 112 to 116 transmit the cell edge band information of the cells 122 to 126 to the base station 111 (step S401).

The base station 111 calculates the interference metric, based on the cell edge bands indicated by the cell edge band information transmitted at step S401 (step S402). The base station 111 determines the cell edge band of the cell 121 (the cell thereof), based on the interference metric calculated at step S402 (step S403).

The base station 111 transmits to the base stations 112 to 116, cell edge band information indicative of the cell edge band determined at step S403 (step S404). The base station 111 performs scheduling of the UE 210 based on the cell edge band determined at step S403 (step S405). The base station 111 transmits to the UE 210, allocation information indicative of the result of the scheduling at step S405 (step S406).

The base station 111 transmits data to the UE 210, based on the result of the scheduling at step S406 (step S407). The UE 210 executes a reception process for the data transmitted at step S407, based on the allocation information transmitted at step S406 (step S408) and a series of operations is terminated. It is assumed that the base station 111 performs the operation of classifying the UEs of the cell 121 into cell center terminals and cell edge terminals in addition to steps depicted in FIG. 4.

As described, the base station 111 according to the first embodiment is able to receive cell edge band information for nearby cells from the base stations of the nearby cells to determine the cell edge band of the cell of the base station 111, based on the cell edge bands indicated by the cell edge band information. Therefore, the base station 111 can easily determine a cell edge band that mitigates interference with the nearby cells at the cell edge terminal in the cell of the base station 111.

Even if the cell edge bands of the nearby cells change, a cell edge band that mitigates interference at the cell edge terminal in the cell of the base station 111 can be determined, adapting to changes in the cell edge bands of the nearby cells. Since the base station 111 transmits to the base stations of the nearby cells, cell edge band information indicative of the determined cell edge band of the cell of the base station 111, the base stations of the nearby cells can also easily determine cell edge bands that mitigate interference at cell edge terminals.

The base station 111 counts the number of each band indicated by the cell edge band information to preferentially determine a band having a smaller count as the cell edge band of the cell of the base station 111 and since a band used by fewer nearby cells as a cell edge band is determined as the cell edge band for the base station 111, the base station 111 is able to set a cell edge band that efficiently mitigates interference at the cell edge terminal of the cell of the base station 111.

Figure 5:
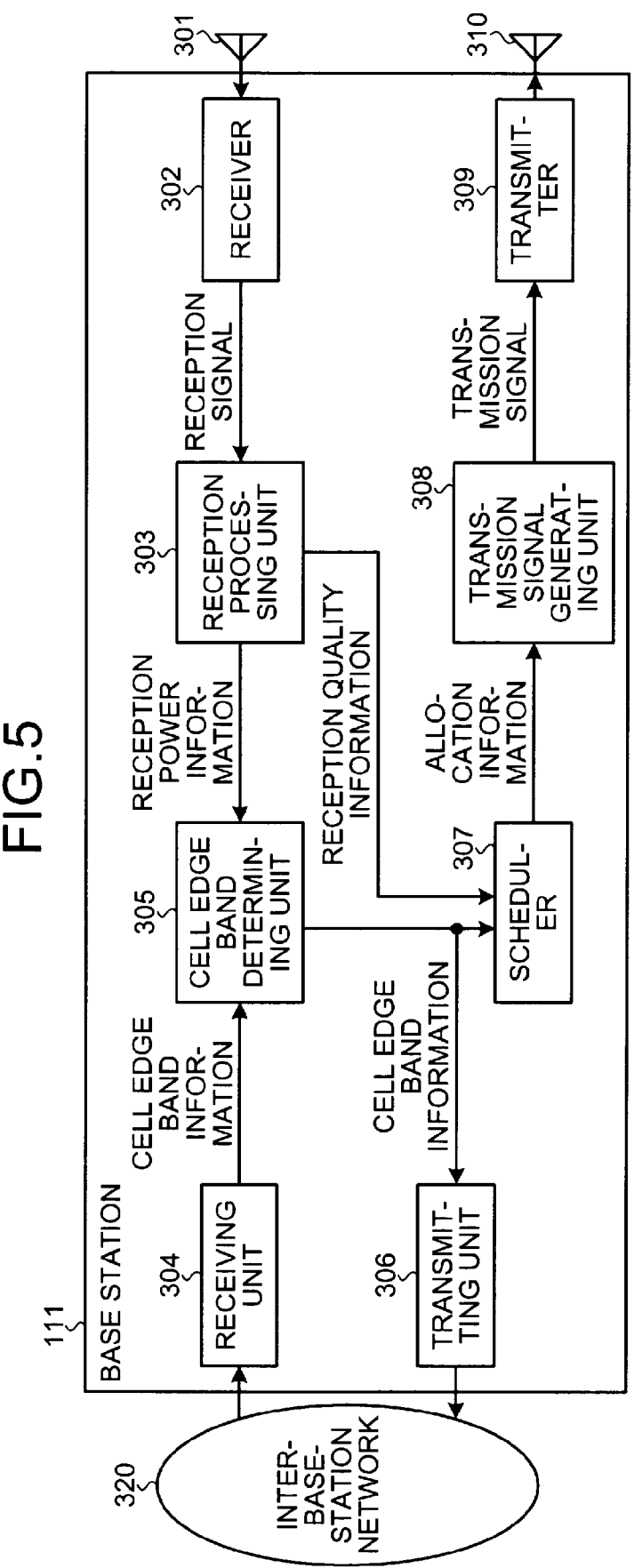
FIG. 5 is a block diagram of an exemplary configuration of a base station according to a second embodiment.

FIG. 5 is a block diagram of an exemplary configuration of a base station according to a second embodiment. In FIG. 5, the constituent elements identical to those depicted in FIG. 3 are denoted by the same reference numerals used in FIG. 3 and will not be described. As depicted in FIG. 5, the receiver 302 and the reception processing unit 303 (power information receiving unit) according to the second embodiment receive reception power information indicative of the strength of a signal received and measured by the UEs.

The reception power information received by the receiver 302 and the reception processing unit 303 includes reception power information indicative of signal strength from the base stations 112 to 116 to the UEs of the cell 121 and reception power information indicative of signal strength from the base station 111 to the UEs of the cell 121. The reception processing unit 303 outputs the received reception power information to the cell edge band determining unit 305.

The cell edge band determining unit 305, based on the reception power information output from the reception processing unit 303, weights a nearby cell having relatively greater received-signal strength with a relatively larger coefficient to count the number of each band. For example, the cell edge band determining unit 305 calculates the interference metric $A_k$ for each of the bands k using equation 2. In equation 2, $w_j$ denotes a weighting coefficient of a nearby cell j. For a nearby cell, the greater the received-signal strength is, the larger the value of $w_j$ is set.

$$A_k = \sum_{j \in J} w_j X_{j,k} \quad (2)$$

Figure 6:
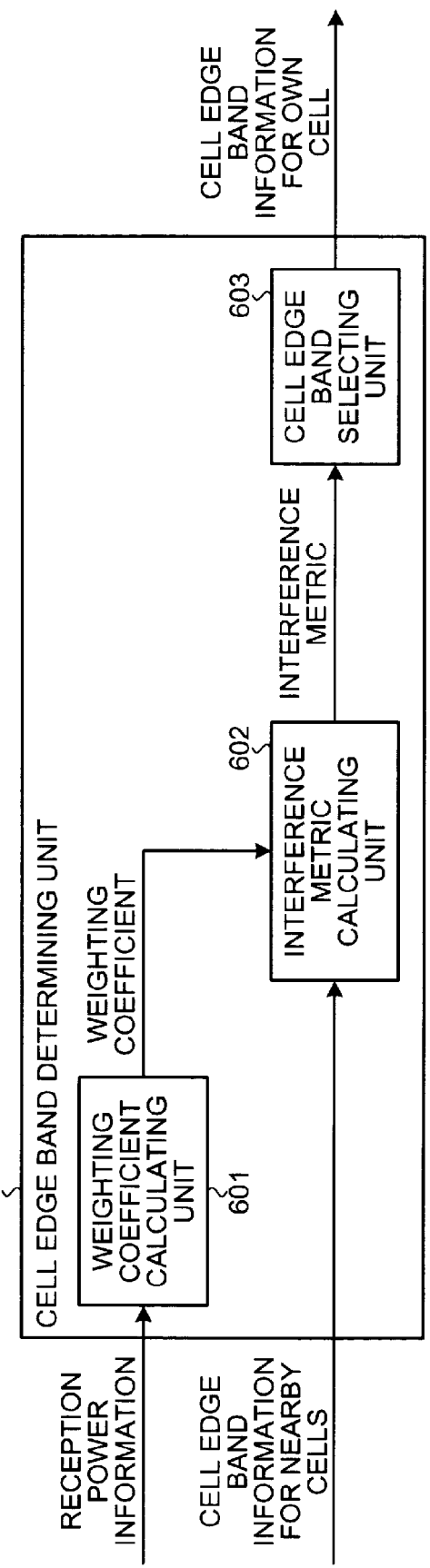
FIG. 6 is a block diagram of an exemplary configuration of a cell edge band determining unit depicted in FIG. 5.

FIG. 6 is a block diagram of an exemplary configuration of the cell edge band determining unit depicted in FIG. 5. As depicted in FIG. 6, the cell edge band determining unit 305 includes a weighting coefficient calculating unit 601, an interference metric calculating unit 602, and a cell edge band selecting unit 603. The weighting coefficient calculating unit 601 calculates weighting coefficients for the cells 122 to 126, based on the reception power information output from the reception processing unit 303. The weighting coefficient calculating unit 601 calculates the weighting coefficients using equation 3, for example.

$$w_j = \frac{1}{L} \sum_{i \in I} H(P_{i,j} - P_{i,serving} + Threshold) \quad (3)$$

In equation 3, $P_{i,j}$ denotes the strength of a signal received at $UE_i$ in the cell 121 from the nearby cell j. $P_{i,serving}$ denotes the strength of a signal received at the $UE_i$ in the cell 121 from the cell 121 (the base station 111). "Threshold" denotes a threshold. "I" denotes a set of the $UE_i$ in the cell 121. $H(x)$ denotes a step function. $H(x)$ is defined by equation 4, for example.

$$H(x) = \begin{cases} 1 & x \geq 0 \\ 0 & x < 0 \end{cases} \quad (4)$$

In equation 3, L denotes a normalization coefficient. For the normalization coefficient L, a value is determined such that equation 5 is satisfied, for example.

$$\sum_{j \in J} w_j = 1 \quad (5)$$

The weighting coefficient calculating unit 601 outputs to the interference metric calculating unit 602, the calculated weighting coefficients $w_j$ for the cells 122 to 126. The interference metric calculating unit 602 calculates the interference metric for each band, based on the weighting coefficients $w_j$ output from the weighting coefficient calculating unit 601 and the cell edge band information concerning the cells 122 to 126 and output from the receiving unit 304.

Specifically, the cell edge band determining unit 305 calculates the interference metric $A_k$ for each of the bands k by using the weighting coefficients $w_j$ calculated using equation 3. This enables the interference metric calculating unit 602 to use a relatively larger coefficient to weight a nearby cell associated with relatively more user terminals for which a difference between the signal strength from the nearby cell and the signal strength from the cell 121 exceeds a threshold, to count the number of bands.

The interference metric calculating unit 602 outputs to the cell edge band selecting unit 603, the interference metric $A_k$ calculated for each of the bands k. For example, the cell edge band selecting unit 603 selects as the cell edge band, the band k having the smallest interference metric $A_k$ output from the interference metric calculating unit 602. The cell edge band selecting unit 603 outputs to the transmitting unit 306 and the scheduler 307, cell edge band information indicative of the selected cell edge band.

Figure 7:
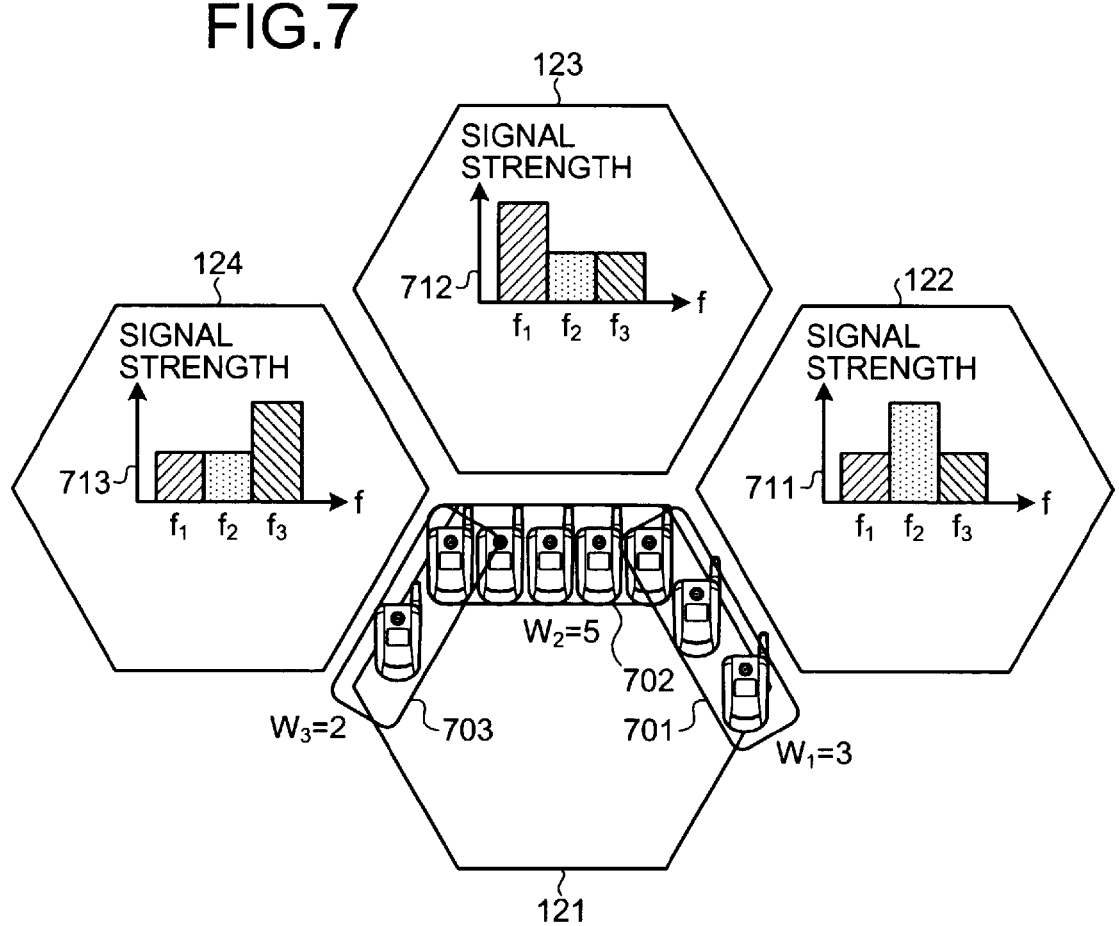
FIG. 7 is a schematic of an example of distributions of UEs in respective cells.

FIG. 7 is a schematic of an example of distributions of UEs in respective cells. The cells 125 and 126 depicted in FIG. 1 are not depicted in FIG. 7. Three UEs are in a cell edge area 701 of the cell 121 near the cell 122. Five UEs are in a cell edge area 702 of the cell 121 near the cell 123. Two UEs are in a cell edge area 703 of the cell 121 near the cell 124.

Graphs 711 to 713 depict signal strength from the cells 122 to 124, respectively, at the UEs in the cell 121. It is assumed that the cell edge bands of the cells 122 to 124 are $f_2$, $f_1$, and $f_3$, respectively. Therefore, signal strength in the band $f_2$ is largest in the graph 711; signal strength in the band $f_1$ is largest in the graph 712; and signal strength in the band $f_3$ is largest in the graph 713.

In the example depicted in FIG. 7, the cell edge band information from the base station 112 of the cell 122 indicates $X_{1,1}=0$, $X_{1,2}=1$, and $X_{1,3}=0$. The cell edge band information from the base station 113 of the cell 123 indicates $X_{2,1}=1$, $X_{2,2}=0$, and $X_{2,3}=0$. The cell edge band information from the base station 114 of the cell 124 indicates $X_{3,1}=0$, $X_{3,2}=0$, and $X_{3,3}=1$.

In the example depicted in FIG. 7, when it is assumed that the indexes of the cells 122 to 124 are 1 to 3, respectively, equation 3 determines the weighting coefficient $w_1=3$ for the cell 122, the weighting coefficient $w_2=5$ for the cell 123, and the weighting coefficient $w_2=2$ for the cell 124. As described, a relatively larger weighting coefficient is allocated to a nearby cell that greatly affects a relatively large number of UEs in the cell 121.

Figure 8:
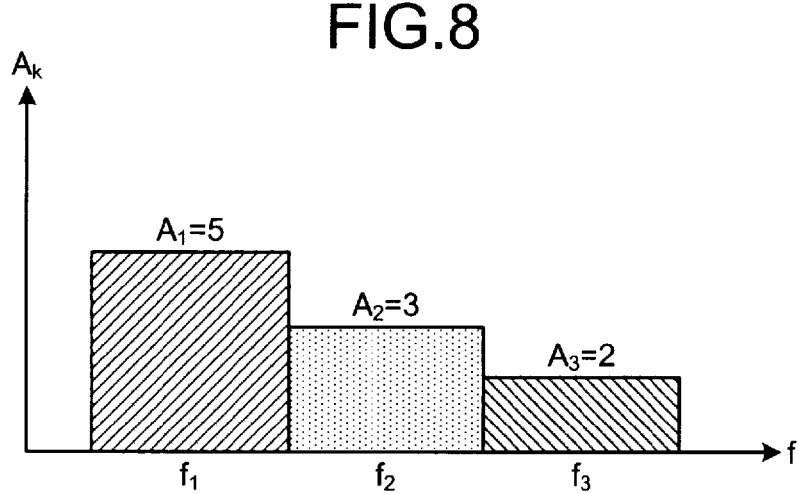
FIG. 8 is a schematic of an example of determination of a cell edge band in the example depicted in FIG. 7.

FIG. 8 is a schematic of an example of determination of the cell edge band in the example depicted in FIG. 7. In FIG. 8, the horizontal axis indicates frequency (f) and the vertical axis indicates the interference metric $A_k$. In the example depicted in FIG. 7, the interference metric $A_k$ in the band k is $A_1=5$, $A_2=3$, and $A_3=2$ as depicted in FIG. 8. In this case, the cell edge band selecting unit 603 selects the band $f_3$ (k=3) having the smallest interference metric $A_k$ as the cell edge band. Therefore, $X_{0,1}=0$, $X_{0,2}=0$, and $X_{0,2}=1$ are output to the transmitting unit 306 and the scheduler 307, as the cell edge band information for the cell 121 (assumed to have an index of 0).

Figure 9:
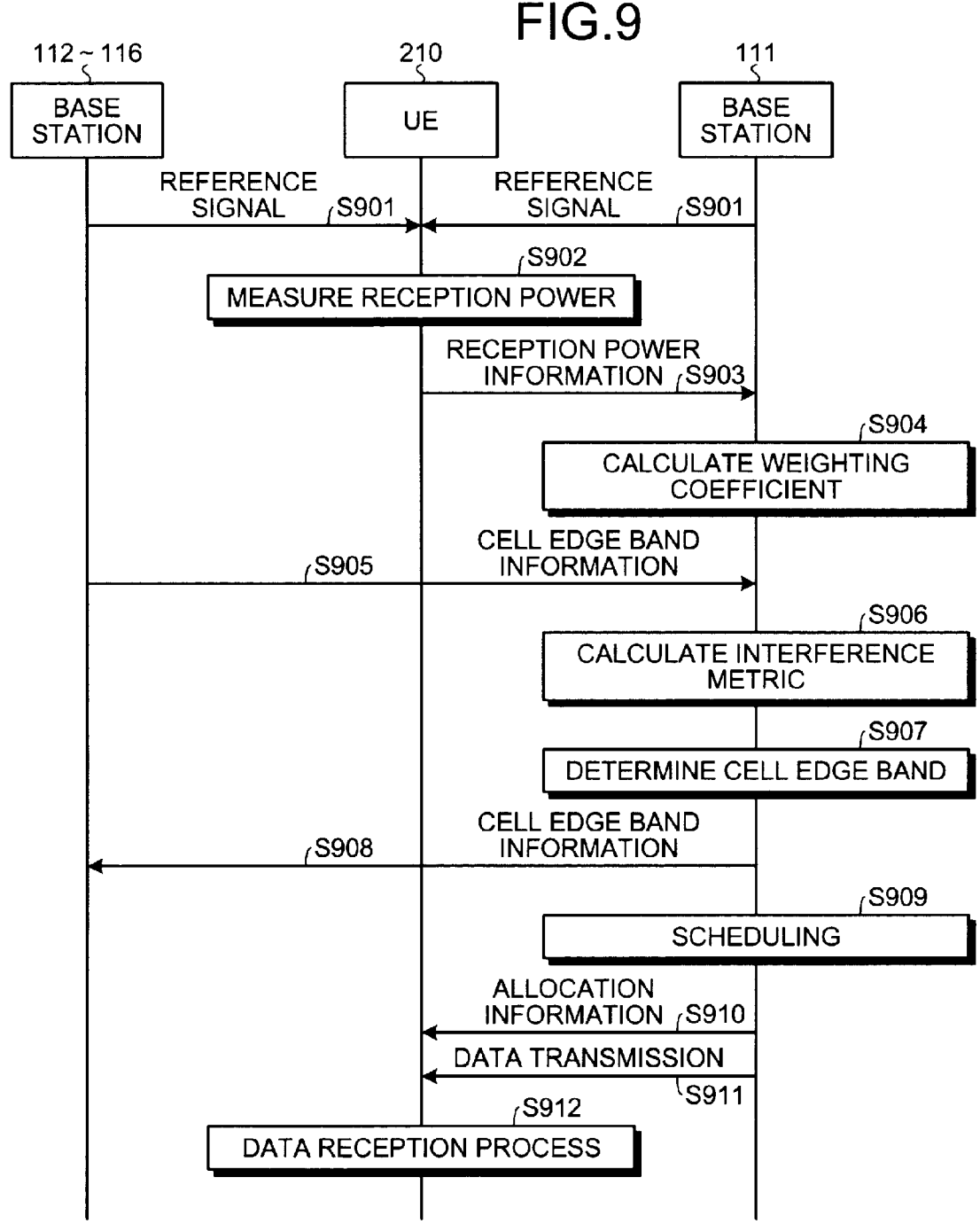
FIG. 9 is a sequence diagram of an example of the operation of the communication system according to the second embodiment.

FIG. 9 is a sequence diagram of an example of the operation of the communication system according to the second embodiment. It is assumed that the UE 210 is classified as a cell edge terminal in the cell 121. As depicted in FIG. 9, first, the UE 210 located in the cell 121 receives reference signals from the base stations 112 to 116 of the cells 122 to 126 and a reference signal from the base station 111 of the cell 121 (step S901).

The UE 210 measures signal strength based on the reference signals received at step S901 (step S902). The UE 210 transmits to the base station 111, reception power information indicative of the signal strengths measured at step S902 (step S903). The base station 111 calculates weighting coefficients for the cells 122 to 126 based on the reception power information transmitted at step S903 (step S904).

Steps S905 to S912 depicted in FIG. 9 are identical to steps S401 to S408 depicted in FIG. 4 and will not be described. However, at step S906, the base station 111 calculates the interference metric using the weights given according to the weighting coefficients calculated at step S904. It is assumed that the base station 111 performs the operation of classifying the UEs of the cell 121 as cell center terminals and cell edge terminals in addition to steps depicted in FIG. 9.

The base station 111 according to the second embodiment weights each of the nearby cells with a different coefficient to count the number of bands as described above. Therefore, an effect identical to that of the first embodiment is achieved and a cell edge band mitigating interference at the cell edge terminal of the cell of the base station 111 can be determined with preferential consideration given to a nearby cell causing relatively greater interference with the cell of the base station 111.

The base station 111 receives reception power information indicative of the signal strength from a nearby cell, at the UE in the cell of the base station 111 and weights nearby cells having relatively greater signal strength with a relatively larger coefficient to count the number of each band. Therefore, a cell edge band that efficiently mitigates interference at the cell edge terminal of the cell of the base station 111 can be determined with preferential consideration given to a nearby cell causing greater interference. A cell edge band mitigating interference at a cell edge terminal in the cell can be determined adaptively according to the temporally varying distribution of UEs.

To count the number of bands, the base station 111 uses a larger coefficient for weighting a nearby cell associated with relatively more UEs for which a difference between the signal strength from the nearby cell and the signal strength from the cell of the base station 111 exceeds a threshold. Therefore, a cell edge band mitigating interference at the cell edge terminal of the cell of the base station 111 can be determined with preferential consideration given to a nearby cell associated with relatively more UEs affected by the interference.

The weighting coefficient calculating unit 601 may calculate the weighting coefficient $w_j$ using equation 6, for example. In equation 6, $T_P$ denotes a threshold.

$$w_j = \frac{1}{L}\sum_{i \in I} H(P_{i,j} - T_p) \tag{6}$$

In equation 6, the weighting coefficient $w_j$ is incremented if the signal strength of the signal from the nearby cell j exceeds the threshold $T_P$ in the $UE_i$ of the cell 121. This enables a nearby cell having relatively greater signal strength to be weighted with a relatively larger coefficient to count the number of each band. Therefore, a cell edge band efficiently mitigating interference at a cell edge terminal in the cell 121 can be determined with preferential consideration given to a nearby cell causing greater interference with the cell 121. If the weighting coefficient $w_j$ is calculated using equation 6, the amount of information can be reduced since the reception power information from the cell 121 (the cell of the base station) for the $UE_i$ of the cell 121 need not be used.

The weighting coefficient calculating unit 601 may calculate the weighting coefficient $w_j$ using equation 7 and based on SINR received by the reception processing unit 303 (a quality information receiving unit), for example. In equation 7, $\gamma_i$ denotes SINR of the $UE_i$.

$$w_j = \frac{1}{L}\sum_{i \in I} f(P_{i,j} - P_{i,serving}, \gamma_i) \tag{7}$$

In equation 7, a function f(x,y) may be represented by equation 8.

$$f(x,y)=H(T_x-x)H(T_y-x) \tag{8}$$

In equation 7, the weighting coefficient $w_j$ is incremented only by the UEs having SINR less than a threshold. Therefore, the weighting coefficient calculating unit 601 is able to weight a nearby cell associated with relatively more UEs having SINR less than the threshold with a relatively larger coefficient to count the number of each band. Therefore, a cell edge band efficiently mitigating interference at a cell edge terminal in the cell 121 can be determined with preferential consideration given to UEs having lower SINR.

Figure 10:
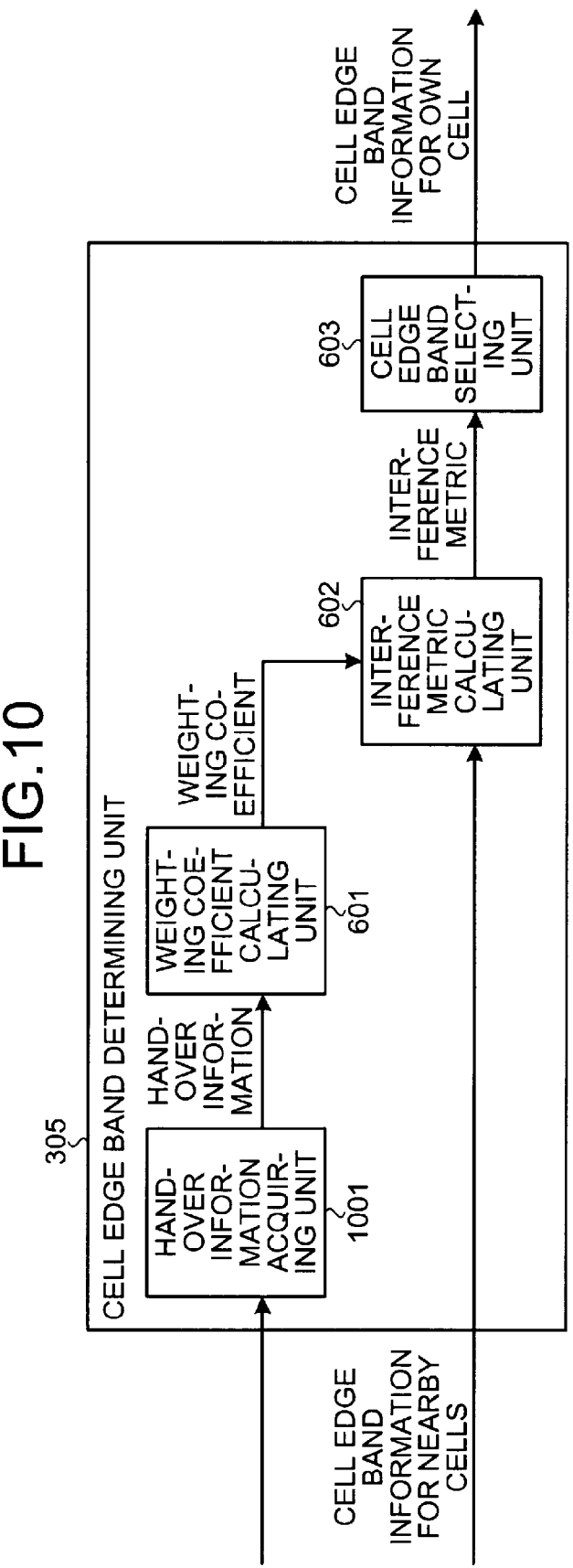
FIG. 10 is a block diagram of an exemplary configuration of a cell edge band determining unit according to a third embodiment.

FIG. 10 is a block diagram of an exemplary configuration of a cell edge band determining unit according to a third embodiment. In FIG. 10, constituent elements identical to those depicted in FIG. 6 are denoted by the same reference numerals used in FIG. 6 and will not be described. As depicted in FIG. 10, the cell edge band determining unit 305 according to the third embodiment includes a handover information acquiring unit 1001 in addition to the constituent elements depicted in FIG. 6.

The handover information acquiring unit 1001 acquires for each nearby cell, handover information indicative of the frequency of handovers of UEs between the cell 121 (the cell of base station 111) and the cells 122 to 126 (nearby cells). For example, the handover information is information indicative of the number of UE handovers per hour or the number of handovers relative to the number of UEs located in the cell of the base station 111 or a nearby cell.

For example, the scheduler 307 of the base station 111 constantly monitors handovers between the cell of the base station 111 and the nearby cells. The handover information acquiring unit 1001 acquires the handover information from the scheduler 307. The handover information acquiring unit 1001 outputs the acquired handover information to the weighting coefficient calculating unit 601. The weighting coefficient calculating unit 601 calculates the weighting coefficients $w_j$ such that a greater weighting coefficient is obtained for a nearby cell having relatively more handovers with the cell 121 of the base station 111, based on the handover information output from the handover information acquiring unit 1001.

Therefore, a cell edge band mitigating interference at a cell edge terminal in the cell 121 can be determined with preferential consideration given to a nearby cell having relatively more handovers with the cell of the base station 111. It is thought that a nearby cell having more handovers causes greater interference with a cell edge terminal in the cell of the base station 111. Therefore, a cell edge band efficiently mitigating interference at a cell edge terminal in the cell 121 can be determined by giving preferential consideration to a nearby cell having more handovers with the cell 121.

The base station 111 according to the third embodiment acquires, for each nearby cell, handover information indicative of the frequency of handovers of UEs between the cell 121 and nearby cells, and weights a nearby cell having relatively more handovers with a relatively larger coefficient to count the number of bands as described above. Therefore, the same effect as the first embodiment is achieved and a cell edge band efficiently mitigating interference at a cell edge terminal in the cell 121 can be determined.

Figure 11:
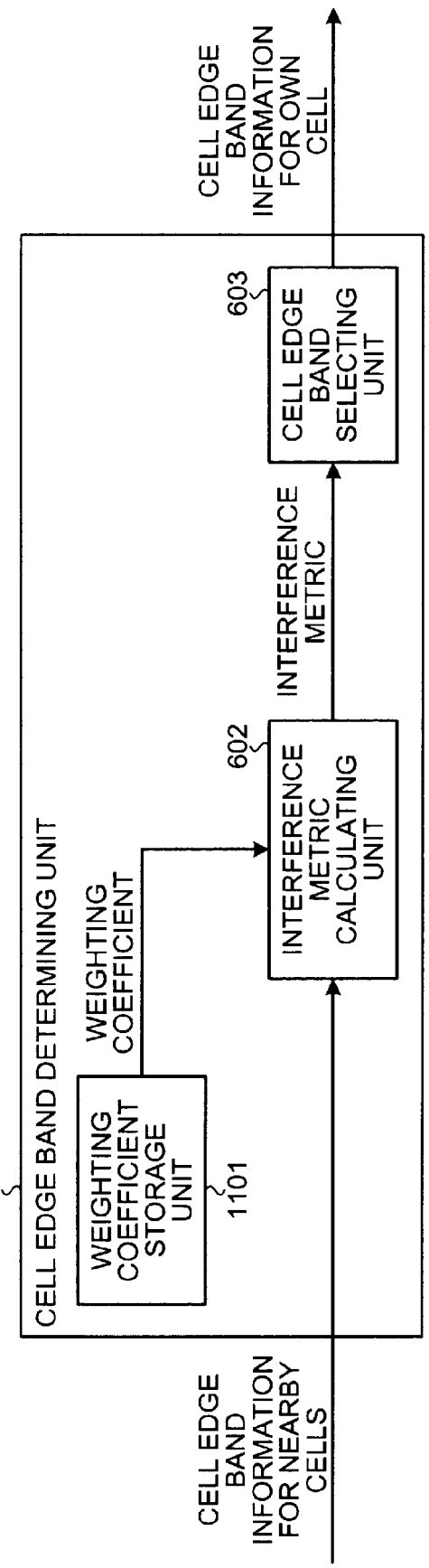
FIG. 11 is a block diagram of an exemplary configuration of a cell edge band determining unit according to a fourth embodiment.

FIG. 11 is a block diagram of an exemplary configuration of a cell edge band determining unit according to a fourth embodiment. In FIG. 11, constituent elements identical to those depicted in FIG. 6 are denoted by the same reference numerals used in FIG. 6 and will not be described. As depicted in FIG. 11, the cell edge band determining unit 305 according to the fourth embodiment includes a weighting coefficient storage unit 1101 instead of the weighting coefficient calculating unit 601 depicted in FIG. 6. The weighting coefficient storage unit 1101 correlates and stores a weighting coefficient $w_j$ with each of the nearby cells j (the cells 122 to 126). For example, the closer in distance a nearby cell is to the cell 121 of the base station 111 (e.g., distance between the base stations), the larger the larger weighting coefficient $w_j$ correlated and stored with the nearby cell is.

The interference metric calculating unit 602 reads the weighting coefficient $w_j$ for each of the nearby cells j (the cells 122 to 126) from the weighting coefficient storage unit 1101 and based on the read weighting coefficient $w_j$, performs weighting to count the number of each band. Specifically, the interference metric calculating unit 602 uses the weighting coefficient $w_j$ read from the weighting coefficient storage unit 1101 to calculate the interference metric $A_k$ for each of the bands k using equation 2.

The base station 111 according to the fourth embodiment correlates and stores a weighting coefficient with each of the nearby cells and based on the stored weighting coefficients, performs weighting to count the number of each band, as described. Therefore, the same effect as the first embodiment is achieved and a cell edge band mitigating interference at a cell edge terminal of the cell 121 of the base station 111 can be determined with preferential consideration given to a nearby cell causing greater interference with the cell 121.

For example, the closer in distance a nearby cell is to the cell 121 of the base station 111, the larger the weighting coefficient the base station 111 may correlate and store with the nearby cell, thereby enabling a cell edge band that efficiently mitigates interference at a cell edge terminal in the cell 121 of the base station 111 to be determined with preferential consideration given to a nearby cell causing greater interference with the cell 121 of the base station 111.

Figure 12:
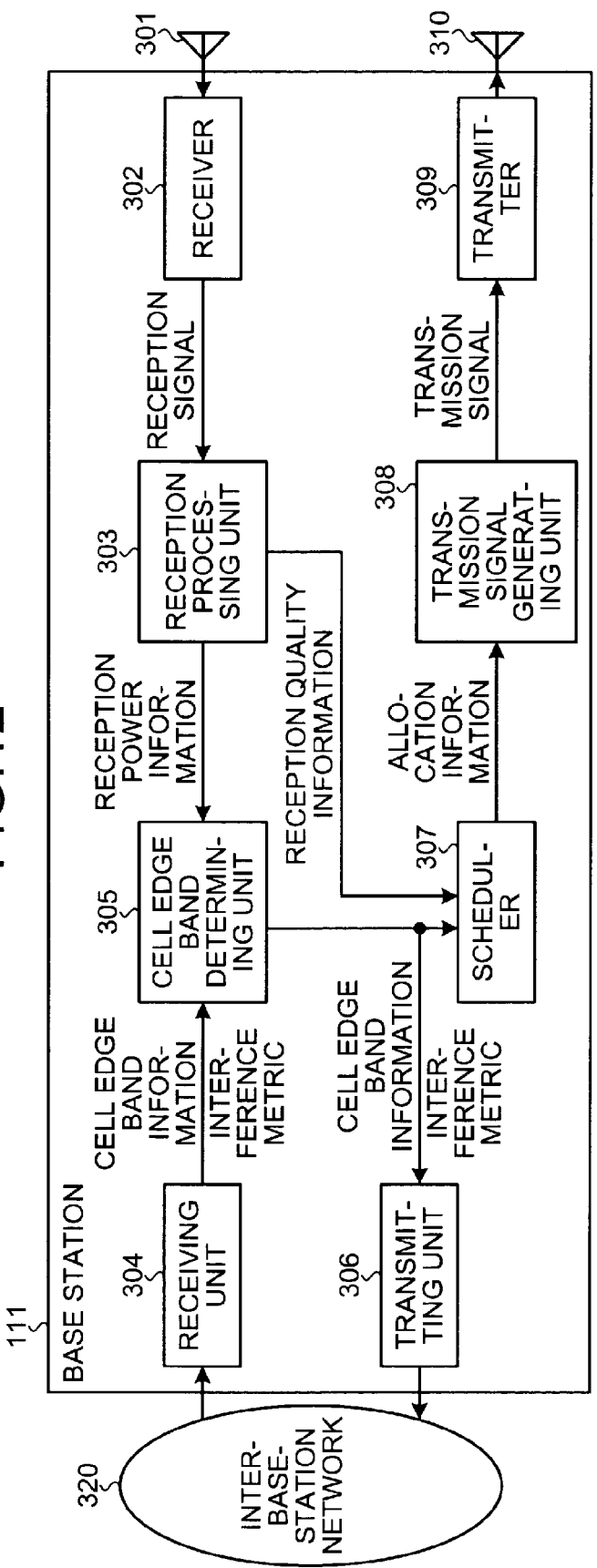
FIG. 12 is a block diagram of an exemplary configuration of a base station according to a fifth embodiment.

FIG. 12 is a block diagram of an exemplary configuration of a base station according to a fifth embodiment. In FIG. 12, constituent elements identical to those depicted in FIG. 3 are denoted by the same reference numerals used in FIG. 3 and will not be described. As depicted in FIG. 12, the receiving unit 304 (count result receiving unit) according to the fifth embodiment receives the interference metrics in the cell edge bands of the cells 122 to 126 (nearby cells). The receiving unit 304 outputs the received interference metrics to the cell edge band determining unit 305. The cell edge band determining unit 305 calculates an interference metric $A_k$ for each of the bands k using equation 9, for example.

$$A_k = \sum_{j \in J} w_j A'_j X_{j,k} \qquad (9)$$

In equation 9, $A'_j$ denotes the interference metric of a cell edge band of the nearby cell j. Using equation 9, the cell edge band determining unit 305 is able to perform weighting according to the interference metrics (count results) in the cell edge bands of the cells 122 to 126 and to count the number of each band.

The cell edge band determining unit 305 outputs to the transmitting unit 306, the interference metric $A_k$ (k denotes the cell edge band) in the determined cell edge band of the cell of the base station 111 together with the cell edge band information for the cell 121 of the base station 111. The transmitting unit 306 (count result transmitting unit) transmits to the base stations 112 to 116, the cell edge band information and the interference metric $A_k$ output from the cell edge band determining unit 305. This enables the base stations 112 to 116 to perform weighting according to the interference metric (count result) in the cell edge band of the cell 121 and to count the number of each band.

The base station 111 according to the fifth embodiment receives the count results for the cell edge bands determined at the base stations of the nearby cells and performs weighting according to the received count results to count the number of each band, as described. This reduces the probability that the cell edge band of the cell 121 will become the same as that of a nearby cell having a greater interference metric of the cell edge band. Therefore, the same effect as the first embodiment is achieved and a cell edge band efficiently mitigating interference at a cell edge terminal of the cell 121 can be determined with preferential consideration given to a nearby cell causing greater interference with the cell 121.

The base station 111 transmits the count result of the determined cell edge band of the cell 121 to the base stations of the nearby cells. Therefore, the base stations of the nearby cells can determine cell edge bands that mitigate interference at cell edge terminals of their own cells with preferential consideration given to a nearby cell causing greater interference with their own cells.

Figure 13:
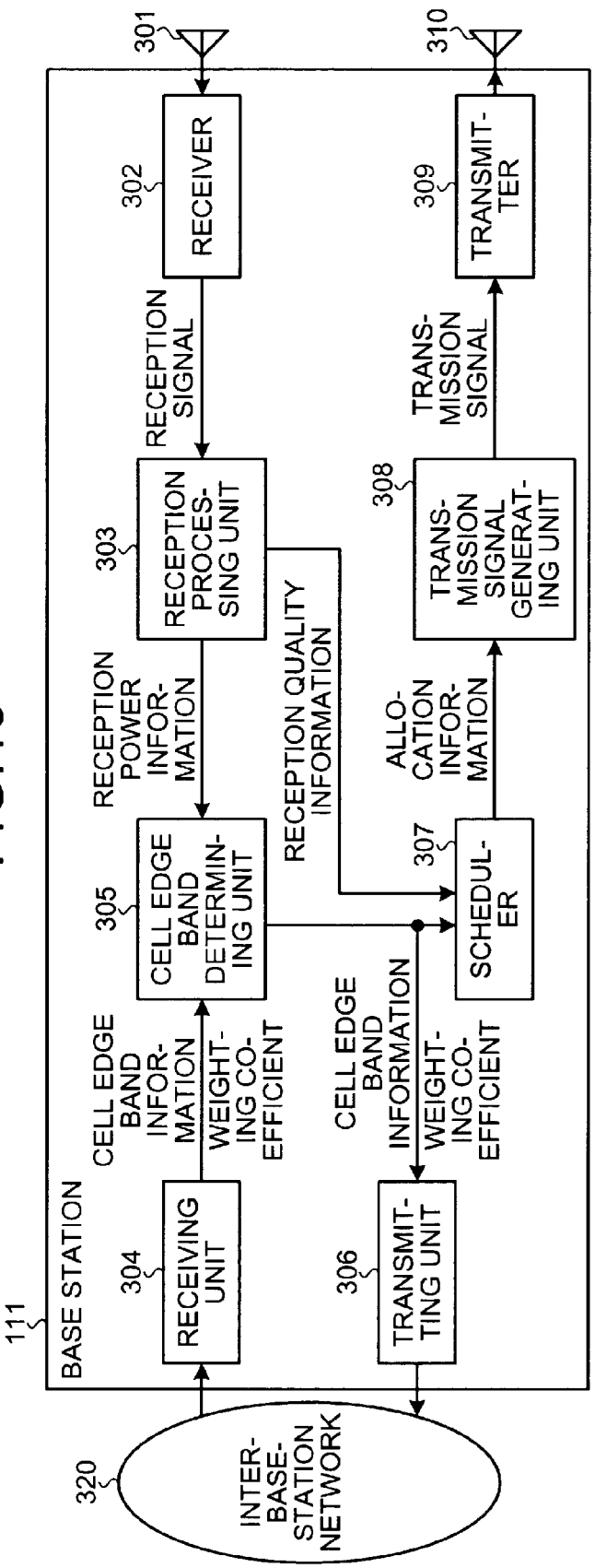
FIG. 13 is a block diagram of an exemplary configuration of a base station according to a sixth embodiment.

FIG. 13 is a block diagram of an exemplary configuration of a base station according to a sixth embodiment. In FIG. 13, constituent elements identical to those depicted in FIG. 3 are denoted by the same reference numerals used in FIG. 3 and will not be described. As depicted in FIG. 13, the receiving unit 304 (coefficient receiving unit) according to the sixth embodiment receives the weighting coefficients for the cell 121 from the base stations 112 to 116. The receiving unit 304 outputs the received weighting coefficients to the cell edge band determining unit 305. The cell edge band determining unit 305 calculates an interference metric $A_k$ for each of the bands k using equation 10, for example.

$$A_k = \sum_{j \in J} w_j w'_j X_{j,k} \qquad (10)$$

In equation 10, $w'_j$ denotes the weighting coefficient used for the cell 121 by the base station of the nearby cell j. Using equation 10, the cell edge band determining unit 305 is able to perform weighting according to the weighting coefficient $w'_j$ used for the cell 121 by the nearby cell j to count the number of each band.

The cell edge band determining unit 305 outputs to the transmitting unit 306, the weighting coefficient $w_j$ used by the base station 111 for each of the nearby cells, along with the cell edge band information for the cell 121 of the base station 111. The transmitting unit 306 (coefficient transmitting unit) transmits to the base stations 112 to 116 of the corresponding nearby cells, the weighting coefficient $w_j$ for each of the nearby cells output from the cell edge band determining unit 305. This enables the base stations 112 to 116 to count the number of each band by performing weighting according to the weighting coefficients $w_j$ used at the cell 121 for the cells 122 to 126.

The cell edge band determining unit 305 may calculate an interference metric $A_k$ for each of the bands k using equation 11, for example.

$$A_k = \sum_{j \in J} \frac{w_j + w'_j}{2} X_{j,k} \qquad (11)$$

In this case, the cell edge band determining unit 305 is also able to count the number of each band by performing weighting according to the weighting coefficient $w'_j$ used by the nearby cell j for the cell 121.

As described, the base station 111 according to the sixth embodiment counts the number of each band by performing weighting according to the weighting coefficients used by the base stations of the nearby cells for the cell 121 of the base station 111. This reduces the probability that the cell edge band of the cell 121 will be the same as that of a nearby cell having a greater weighting coefficient for the cell 121. Therefore, the same effect as the first embodiment is achieved and a cell edge band that mitigates interference at a cell edge terminal of the cell 121 can be determined with preferential consideration given to a nearby cell causing relatively greater interference with the cell 121.

The base station 111 transmits to the base stations of the corresponding nearby cells, the weighting coefficient for each of the nearby cells used by the base station 111. Therefore, the base stations of the nearby cells can determine cell edge bands that mitigate interference at cell edge terminals of their own cells with preferential consideration given to a nearby cell causing greater interference with their own cells.

Figures 14, 15:
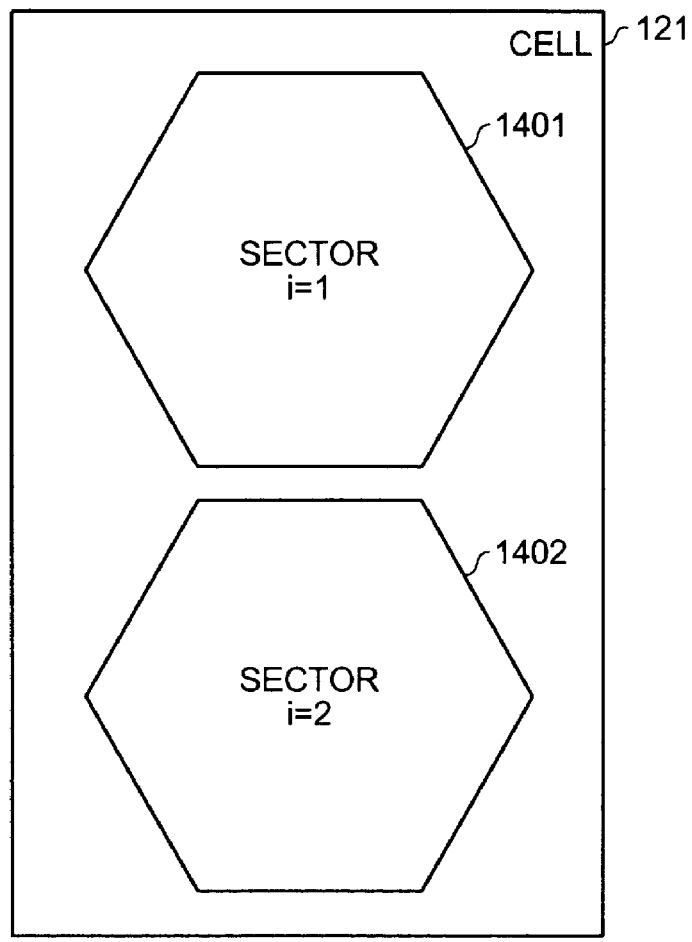
FIG. 14 is a schematic depicting the cell of a base station according to a seventh embodiment.
FIG. 15 is a schematic depicting an example of calculation of an interference metric caused by other cells.

FIG. 14 is a schematic depicting the cell of the base station according to a seventh embodiment. As depicted in FIG. 14, the cell 121 of the base station 111 according to the seventh embodiment includes multiple sectors (sectors 1401 and 1402). It is assumed that the index numbers i of the sectors 1401 and 1402 are 1 and 2, respectively. If M, N, and $F_m$ denote the number of sectors of the cell 121 (which is two in the example depicted in FIG. 14), the division number of bands, and a cell edge band of a sector m, respectively, the number of combinations of the cell edge band $F_m$ is $M^N$.

The cell edge band determining unit 305 determines the cell edge band for each of the M sectors. For example, the cell edge band determining unit 305 calculates an interference metric $A_{m,Fm}$ using equation 12 for each of the $M^N$ cell edge bands $F_m$.

$$A_{m,Fm} = \sum_{j \in J} w_j X_{j,Fm} \ (m = 1, 2, \ldots, M) \qquad (12)$$

The cell edge band determining unit 305 calculates the maximum value of $A_{m,Fm}$ for each of the M sectors m from the calculated $M^N$ of $A_{m,Fm}$. The cell edge band determining unit 305 selects, for each of the M sectors m, a combination of the cell edge bands $F_m$ having the smallest maximum value of $A_{m,Fm}$. Alternatively, the cell edge band determining unit 305 calculates the average value of $A_{m,Fm}$ for each of the M sectors m from the calculated $M^N$ of $A_{m,Fm}$. The cell edge band determining unit 305 may select a combination of the cell edge bands $F_m$ having the smallest average value of $A_{m,Fm}$ for each of the M sectors m.

The cell edge band determining unit 305 outputs to the transmitting unit 306 and the scheduler 307, cell edge band information indicative of the selected combination of the cell edge bands $F_m$. A specific example of selecting the combination of cell edge bands will hereinafter be described. An interference metric $A_{i,j}$ of a band k in a sector i may be represented by equation 13, for example.

$$A_{i,k} = \sum_{\substack{j \in Jself \\ j \neq i}} w_{ij} X_{j,k} + \sum_{j \in Jothers} w_{ij} X_{j,k} = A_{i,k}^{(self)} + A_{i,k}^{(others)} \qquad (13)$$

In equation 13, $w_{ij}$ denotes a weighting coefficient of a sector j calculated in the sector i. $J_{self}$ denotes a set of sectors of the cell 121. $J_{others}$ denotes a set of sectors of nearby cells (the cells 122 to 126). In equation 13, a first term indicates the contribution of the cell 121 to the interference metric $A_{i,k}$ and a second term indicates the contribution of the nearby cells to the interference metric $A_{i,k}$.

If M and N denote the number of sectors in the sector and the division number of bands, the number of selection patterns of the cell edge band (the cell edge band $F_m$) is $M^N$. If the index of the selection pattern of the cell edge band is denoted by l, the index of the cell edge band in the sector i is represented by $f_l(i)$. If the selection pattern l is selected, an interference metric $A_i^{(l)}$ in the cell edge band $f_l(i)$ may be represented by equation 14, for example.

$$A_i^{(1)} = \sum_{\substack{j \in Jself \\ j \neq i}} w_{ij} X_{j,f_1(i)}^{(1)} + \sum_{j \in Jothers} w_{ij} X_{j,f_1(i)} \quad (14)$$

$$= \sum_{\substack{j \in Jself \\ j \neq i}} w_{ij} X_{j,f_1(i)}^{(1)} + A_{i,f_1(i)}^{(others)}$$

In equation 14, $X_{j,k}^{(l)}$ denotes the cell edge band information indicative of the cell edge band in the sector j when the selection pattern l is selected. The cell edge band determining unit 305 selects the selection pattern l, which minimizes the maximum value of the interference metric $A_i^{(l)}$ in the cell by using equation 15, for example.

$$1_{opt} = \arg\min_{1}\left\{\max_i \{A_i^{(1)}\}\right\} \quad (15)$$

An example will be described where the number of sectors M=2 (see FIG. 14) and the division number of bands N=3. In this example, the interference metric in the cell edge band of a sector 1 (the sector 1401) is represented by equation 16 and the interference metric in the cell edge band of a sector 2 (the sector 1402) is represented by equation 17.

$$A_1^{(1)} = w_{12} X_{2,f_1(i)}^{(1)} + A_{1,f_1(i)}^{(others)} \quad (16)$$

$$A_2^{(1)} = w_{21} X_{1,f_1(i)}^{(1)} + A_{2,f_1(i)}^{(others)} \quad (17)$$

If the cell edge selection pattern l=0 is determined, i.e., if a band 0 is determined as the cell edge band in the sector 1 and the sector 2, equation 16 becomes equation 18, and equation 17 becomes equation 19.

$$A_1^{(0)} = w_{12} X_{2,0}^{(0)} + A_{1,0}^{(others)} = w_{12} + A_{1,0}^{(others)} \quad (18)$$

$$A_2^{(1)} = w_{21} X_{1,0}^{(1)} + A_{2,0}^{(others)} = w_{21} + A_{2,0}^{(others)} \quad (19)$$

FIG. 15 is a schematic depicting an example of calculation of the interference metric caused by other cells. A table 1500 depicted in FIG. 15 describes correlation among the sector i (i=1, 2), the band k (k=0, 1, 2), and an example of calculation of the interference metric $A_{j,k}^{(others)}$ caused by other cells. It is assumed that the weight coefficient for the sector 2 used in the sector 1 is $w_{12}$=3 and that the weight coefficient for the sector 1 used in the sector 2 is $w_{21}$=6. It is assumed that the calculation result of the interference metric $A_{j,k}^{(others)}$ caused by other cells is as described in the table 1500. In this case, equation 18 becomes equation 20, and equation 19 becomes equation 21.

$$A_1^{(0)} = w_{12} + A_{1,0}^{(others)} = 3 + 5 = 8 \quad (20)$$

$$A_2^{(1)} = w_{21} + A_{2,0}^{(others)} = 6 + 4 = 10 \quad (21)$$

FIG. 16 is a schematic depicting an example of calculation of the interference metric for each band. A table 1600 depicted in FIG. 16 describes correlation among the cell edge band selection pattern l, the indexes of the cell edge bands in the sectors 1 and 2, the interference metrics in the sectors 1 and 2, and the calculation result of the maximum value of the interference metrics of the sectors.

For example, in the case of the cell edge band selection pattern l=0, the indexes of the cell edge bands in the sectors 1 and 2 are 0 and 0; the interference metrics in the sectors 1 and 2 are 8 and 10; and the calculation result of the maximum value of the interference metrics of the sectors is 10. As described in the table 1600, the maximum value of the interference metrics of the sectors is minimized to 5 in the case of the cell edge band selection pattern l=1. Therefore, the cell edge band determining unit 305 determines the index of the cell edge band of the sector 1 as 0 and the index of the cell edge band of the sector 2 as 1.

The cell edge band determining unit 305 determines a combination of the cell edge bands for optimizing the interference metrics of the sector 1 and the sector 2 together as described above. This enables the cell edge bands to be determined such that the interference in the cell edge bands are equally mitigated in the sector 1 and the sector 2. However, the cell edge band determining unit 305 may sequentially optimize the interference metrics of the sector 1 and the sector 2.

For example, it is assumed that the initial values of the cell edge bands are 0 in both the sector 1 and the sector 2. Since the cell edge band of the sector 2 is 0, the cell edge band determining unit 305 selects a cell edge band 2 minimizing the interference metric as the cell edge band of the sector 1 (comparison among l=0, 3, and 6). Since the cell edge band of the sector 1 is 1, the cell edge band determining unit 305 then selects a cell edge band 1 minimizing the interference metric as the cell edge band of the sector 2 (comparison among l=6, 7, and 8).

The base station 111 according to the seventh embodiment can determine a cell edge band for each sector to mitigate interference at a cell edge terminal in the cell 121 as described above when multiple sectors are included in the cell 121. The base station 111 calculates the maximum value of the count results of the sectors to determine the cell edge band of each sector such that the calculated maximum value of the sectors is minimized. Therefore, a cell edge band equally mitigating interference at cell edge terminals in each sector can be determined.

Alternatively, the base station 111 may calculate the average value of the count results for each of the sectors to determine a cell edge band for each sector such that the calculated average value for each sector is minimized. Therefore, a cell edge band completely preventing interference at a cell edge terminal of each sector can be determined.

As described above, the base station, the communication system, and the communication method can mitigate interference of the cell edge terminal. Although the description has been made of the example of classifying UEs into cell edge terminals and cell center terminals according to a threshold in the embodiments, classification into cell edge terminals and cell center terminals based on the reception quality is not limited hereto.

For example, a predetermined number of UEs may be defined as the cell edge terminals in a sequence from the lowest reception quality among UEs and other UEs may be defined as the cell center terminals. Alternatively, UEs accounting for a predetermined rate may be defined as the cell edge terminals in a sequence from the lowest reception quality among UEs and other UEs may be defined as the cell center terminals. The reception quality is not limited to SINR and may be signal strength or an error rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station used in a communication system wherein user terminals are classified into cell center terminals and cell edge terminals based on reception quality, the base station comprising:
   a receiving unit that receives band information, transmitted from another base station, which indicates a frequency band allocated to cell edge terminals in a cell of the other base station;
   a determining unit that determines a frequency band to be allocated to cell edge terminals in a cell of the base station, based on the band information received from a plurality of base stations that form nearby cells; and
   a communicating unit that, using the frequency band determined by the determining unit, communicates with the cell edge terminals in the cell of the base station.

2. The base station according to claim 1, further comprising a transmitting unit that transmits to base stations of the nearby cells, cell edge band information indicative of the determined cell edge band.

3. The base station according to claim 1, wherein
   the communicating unit, via a band that is different from the cell edge band of the cell edge terminals, communicates with the cell center terminals in the cell of the base station, and
   the communicating unit communicates with the cell edge terminals by using a transmission power that is greater than a transmission power used for communication with the cell center terminals.

4. The base station according to claim 1, wherein
   the receiving unit receives the cell edge band information from a plurality of nearby cells, and
   the determining unit counts the number of each band indicated by the cell edge band information and preferentially determines a band having a relatively small count result as the cell edge band.

5. The base station according to claim 4, wherein the determining unit weights each of the nearby cells with a different coefficient to count the number of each band.

6. The base station according to claim 5, further comprising a storage unit that for each of the nearby cells, correlates and stores a coefficient, wherein
   the determining unit, based on the coefficients stored in the storage unit, performs weighting to count the number of each band.

7. The base station according to claim 6, wherein the storage unit correlates and stores a coefficient with a nearby cell, where the closer in distance the nearby cell is to the cell of the base station, the larger the weighted coefficient is.

8. The base station according to claim 4, further comprising a power information receiving unit that receives reception power information indicative of signal strength that is from the nearby cells and measured by the user terminals in the cell of the base station, wherein
   the determining unit, based on the reception power information received by the power information receiving unit, weights a nearby cell with a coefficient to count the number of each band, where the greater the signal strength is, the larger the weighted coefficient is.

9. The base station according to claim 4, further comprising a power information receiving unit that receives reception power information indicative of signal strength from the nearby cells and signal strength from the cell of the base station as measured by the user terminals in the cell of the base station, wherein
   the determining unit, based on the reception power information received by the power information receiving unit and to count the number of each band, weights a coefficient to a nearby cell associated with user terminals for which a difference between the signal strength from the nearby cells and the signal strength from the cell of the base station exceeds a threshold, where the more user terminals the nearby cell is associated with, the larger the weighted coefficient is.

10. The base station according to claim 4, further comprising a quality information receiving unit that receives signal to interference and noise ratios for the user terminals in the cell of the base station, wherein
    the determining unit, based on the signal to interference and noise ratios received by the quality information receiving unit and to count the number of each band, weights a coefficient to a nearby cell associated with user terminals having a signal to interference and noise ratio that is less than a threshold, where the more user terminals the nearby cell is associated with, the larger the weighted coefficient is.

11. The base station according to claim 4, further comprising an acquiring unit that acquires for each of the nearby cells, handover information indicative of the frequency of user terminal handover between the cell of the base station and the nearby cells, wherein
    the determining unit, based on the handover information acquired by the acquiring unit and to count the number of the bands, weights a nearby cell having handovers with a coefficient, where the more the handovers the nearby cell has, the larger the weighted coefficient is.

12. The base station according to claim 4, further comprising a count result receiving unit that receives count results for each cell edge band determined at base stations of the nearby cells, wherein
    the determining unit, to count the number of each band, performs weighting according to the count results received by the count result receiving unit.

13. The base station according to claim 12, further comprising a count result transmitting unit that transmits to the base stations of the nearby cells, the count results for the cell edge band determined by the determining unit.

14. The base station according to claim 4, further comprising a coefficient receiving unit that receives coefficients that correspond to the cell of the base station and are used in the nearby cells, wherein
    the determining unit, to count the number of each band, performs weighting according to the coefficients received by the coefficient receiving unit.

15. The base station according to claim 14, further comprising a coefficient transmitting unit that transmits to base stations of nearby cells, the coefficients used by the base station for each of the nearby cells.

16. The base station according to claim 4, wherein the cell of the base station includes a plurality of sectors, and the determining unit calculates a maximum value of count results for the sectors to determine a cell edge band for each of the sectors such that the calculated maximum value of the sectors is minimized.

17. The base station according to claim 4, wherein the cell of the base station includes a plurality of sectors, and the determining unit calculates, for each of the sectors, an average value of count results to determine a cell edge band for each of the sectors such that the calculated average value of the sectors is minimized.

18. The base station according to claim 1, wherein the cell of the base station includes a plurality of sectors, and the determining unit determines a cell edge band for each of the sectors.

19. A communication system comprising:
- a plurality of user terminals classified into cell center terminals and cell edge terminals, based on reception quality; and
- a plurality of base stations,
- wherein each of the plurality of base stations receives band information, transmitted from another base station, which indicates a frequency band allocated to a cell edge terminal in a cell of the other base station, and communicates with cell edge terminals in a cell of the base station using a frequency band determined based on the band information received from one or more of the base stations that form nearby cells.

20. A communication method for a base station used in a communication system wherein user terminals are classified into cell center terminals and cell edge terminals based on reception quality, the communication method comprising:
- receiving band information, transmitted from another base station, which indicates a frequency band allocated to a cell edge terminal in a cell of the other base station;
- determining a frequency band to be allocated to cell edge terminals in a cell of the base station, based on the band information received from a plurality of base stations that form nearby cells ; and
- communicating with the cell edge terminals in the cell of the base station using the determined frequency band.

* * * * *